United States Patent [19]

Averbuch et al.

[11] Patent Number: 5,502,752
[45] Date of Patent: Mar. 26, 1996

[54] CLOCK RATE MATCHING IN INDEPENDENT NETWORKS

[75] Inventors: Nimrod Averbuch, Buffalo Grove; Steven V. Schatz, McHenry, both of Ill.

[73] Assignee: Motorola, inc., Schaumburg, Ill.

[21] Appl. No.: 49,248

[22] Filed: Apr. 20, 1993

Related U.S. Application Data

[63] Continuation of Ser. No. 660,454, Feb. 22, 1991, abandoned.

[51] Int. Cl.⁶ .................................. H04L 7/00; H04J 3/22
[52] U.S. Cl. .............................. 375/377; 375/356; 370/84
[58] Field of Search .................................. 375/107, 106, 375/109, 112, 114, 122, 8, 354, 356, 377, 222, 358, 363, 365, 366; 379/63, 58, 59; 371/47.1, 2.1; 369/60; 370/105.1, 102, 105.4, 84; 455/69, 68, 88, 51.1, 33.1, 54.1

[56] References Cited

U.S. PATENT DOCUMENTS

| | | | |
|---|---|---|---|
| 3,420,956 | 1/1969 | Heightley et al. | 375/112 |
| 3,873,773 | 3/1975 | Guy, Jr. | 370/102 |
| 4,074,080 | 2/1978 | Dragotinov et al. | 375/107 |
| 4,224,473 | 9/1980 | Kaul et al. | 370/102 X |
| 4,716,575 | 12/1987 | Dauros et al. | 370/108 |
| 4,759,041 | 7/1988 | Anderson et al. | 375/118 |
| 4,791,652 | 12/1988 | Mc Eachern et al. | 375/112 X |
| 4,803,726 | 2/1989 | Levine et al. | 375/112 |
| 4,885,758 | 12/1989 | Speckenbach | 375/112 X |
| 4,890,303 | 12/1989 | Bader | 375/107 |
| 4,910,794 | 3/1990 | Mahanu | 370/84 |
| 4,941,156 | 7/1990 | Stern et al. | 375/118 |
| 4,953,180 | 8/1990 | Fieschi et al. | 375/8 |
| 5,040,177 | 8/1991 | Martin et al. | 379/61 |
| 5,140,616 | 8/1992 | Renner | 375/107 |
| 5,140,627 | 8/1992 | Dahlin | 379/60 |
| 5,177,738 | 1/1993 | Dell'Oro et al. | 370/84 |
| 5,251,217 | 10/1993 | Travers et al. | 370/84 |

OTHER PUBLICATIONS

"ISDN Systems Architecture, Technology and Applications", Pramode K. Verma ATPT, p. 234.

D. M. Balston et al., "Data Service Handling in the GSM Cellular Radio System," *Electronic Engineering*, vol. 62, No. 762, Jun. 1990, pp. 79–85, Woolwich, London, Great Britain.

*Primary Examiner*—Stephen Chin
*Assistant Examiner*—Tesfaldet Bocure
*Attorney, Agent, or Firm*—Richard A. Sonnentag

[57] ABSTRACT

An apparatus and method for clock rate matching in independent networks is disclosed. The apparatus accepts data from a modem (126) into a buffer (400) and determines the difference between the rate of the data entering the buffer (400) at the modem clock rate to the rate of data exiting the buffer (400) at the clock rate used by the apparatus. Depending on the rate difference, the apparatus either speeds up or slows down the data rate accordingly.

80 Claims, 7 Drawing Sheets

200

| OCTET NUMBER | BIT NUMBER | | | | | | |
|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

*FIG. 2*

| | | | | | | | |
|---|---|---|---|---|---|---|---|
| 0 | 0 | 0 | 0 | 0 | 0 | 0 | 0 |
| 1 | D1 | D2 | D3 | D4 | D5 | D6 | S1 |
| 1 | D7 | D8 | D9 | D10 | D11 | D12 | X |
| 1 | D13 | D14 | D15 | D16 | D17 | D18 | S3 |
| 1 | D19 | D20 | D21 | D22 | D23 | D24 | S4 |
| 1 | E1 | E2 | E3 | E4 | E5 | E6 | E7 |
| 1 | D25 | D26 | D27 | D28 | D29 | D30 | S6 |
| 1 | D31 | D32 | D33 | D34 | D35 | D36 | X |
| 1 | D37 | D38 | D39 | D40 | D41 | D42 | S8 |
| 1 | D43 | D44 | D45 | D46 | D47 | D48 | S9 |
| 0 | 0 | 0 | 0 | 0 | 0 | 0 | 0 |
| 1 | D1 | D2 | D3 | D4 | D5 | D6 | S1 |
| 1 | D7 | D8 | D9 | D10 | D11 | D12 | X |
| 1 | D13 | D14 | D15 | D16 | D17 | D18 | S3 |
| 1 | D19 | D20 | D21 | D22 | D23 | D24 | S4 |
| 1 | E1 | E2 | E3 | E4 | E5 | E6 | E7 |
| 1 | D25 | D26 | D27 | D28 | D29 | D30 | S6 |
| 1 | D31 | D32 | D33 | D34 | D35 | D36 | X |
| 1 | D37 | D38 | D39 | D40 | D41 | D42 | S8 |
| 1 | D43 | D44 | D45 | D46 | D47 | D48 | S9 |

Rows 1-10: V.110N 300
Rows 11-20: V.110N+1 305
Full table: MULTI-FRAME 310

*FIG. 3*

CLOCK RATE MATCHING IN INDEPENDENT NETWORKS

This is a continuation of application Ser. No. 07/660,454, filed Feb. 22, 1991 and now abandoned.

FIELD OF THE INVENTION

The invention relates generally to matching data rates with independent clock sources across networks and more specifically to matching data rates with independent clock sources by adding or deleting entire bits in response to clock underspeed or overspeed conditions.

BACKGROUND OF THE INVENTION

Current methods of matching data rates between networks with independent clock sources are designed to operate in a nearly error free environment. One such method is that described in CCITT Blue Book Recommendations V.110, (1988) which may make clock compensations in fractions of bit times. Since the V.110 frame is comprised of 80 total bits, 48 of which are data bits, if the user clock rate is 4.8 Kb/s then each of the 48 data bits in the V.110 frame are used. If, however, the user data rate is 2.4 Kb/s or 1.2 Kb/s, only ½ and ¼ respectively of the 48 data bits in the V.110 frame are used. In this case, ½ and ¾ of the data bits in the V.110 frame go unused and are eventually redundantly coded. In addition to data bits, clock rate information is also transmitted in the V.110 frame along with network independent clock adjustment information. In error free systems, this information is passed along from one clock source to another so that the independent data source can determine the amount of compensation required to accurately convey data.

The above described method is well suited for integrated services digital network (ISDN) environments where typical bit error rates (BER) are in the order of $10^{-9}$. However, when used in a digital radiotelephone environment, for example the Groupe Special Mobile or GSM digital radiotelephone system environment, the method is subjected to typical BER's on the order of $10^{-3}$ to $10^{-5}$. The implementation of clock rate matching as described by CCITT Recommendations V.110, when used in the GSM environment, causes several problems. First, the method as recommended by the CCITT uses fractions of bit times depending on the data rate to perform clock compensation, however this information is not maintained by the GSM air interface specification which essentially compresses and optimizes the V.110 frame for over-the-air transmission. The lower fractional data rates are lost in the optimization. Second, errors introduced at the GSM air interface may cause the GSM data services to arbitrarily add or delete bits from the user data stream in the V.110 frame. If this occurs, not only are data errors incurred, but also the total number of data bits is disturbed due to corruption of the clock compensation mechanism described in CCITT Recommendation V.110. This problem itself may render certain types of error correcting protocols useless in the GSM environment.

Another shortcoming of the V.110 method of matching user data clock speeds is the requirement of a sampling mechanism to monitor the phase difference between the two clocks in the independent clocks. In order to achieve the required resolution, the clocks should be oversampled in order to measure the required phase difference. This requirement adds an extra and expensive overhead to the GSM data support platform and adds eight complex phase states necessary to implement the compensation mechanism.

Thus, a need exists for a method of matching user data rates with independent clock sources across networks in a high BER environment and also does not require expensive, real-time intensive, and complex additions to the data support platform.

SUMMARY OF THE INVENTION

An apparatus matches clock rates between independent networks. The apparatus is employed in a source network and has as input data bits conveyed at a first clock rate. The apparatus provides a second clock rate, accepts at least a predetermined number of data bits conveyed at a first clock rate, determines the difference between the first clock rate and the second clock rate, and responsive to the determination, alters the predetermined number of data bits D by at least one data bit.

DETAILED DESCRIPTION OF THE DRAWINGS

FIG. 1 generally depicts a radiotelephone system which may incorporate the present invention.

FIG. 2 depicts the structure of a V.110 frame as defined by CCITT recommendation V.110.

FIG. 3 depicts two successive V.110 frames forming a multi-frame in accordance with the invention.

Figure 4:
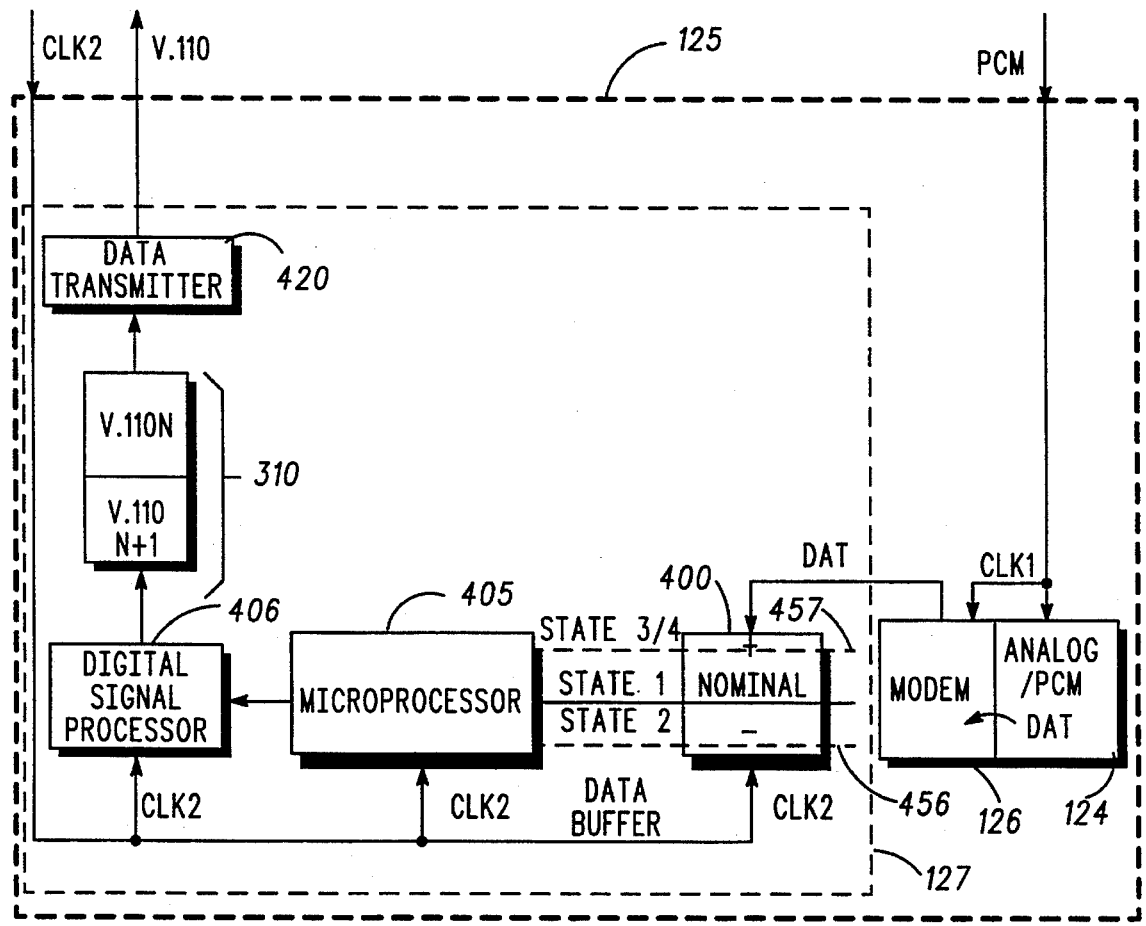

FIG. 4 generally illustrates an apparatus which performs independent clock rate matching in a transmitter in accordance with the invention.

Figure 5:
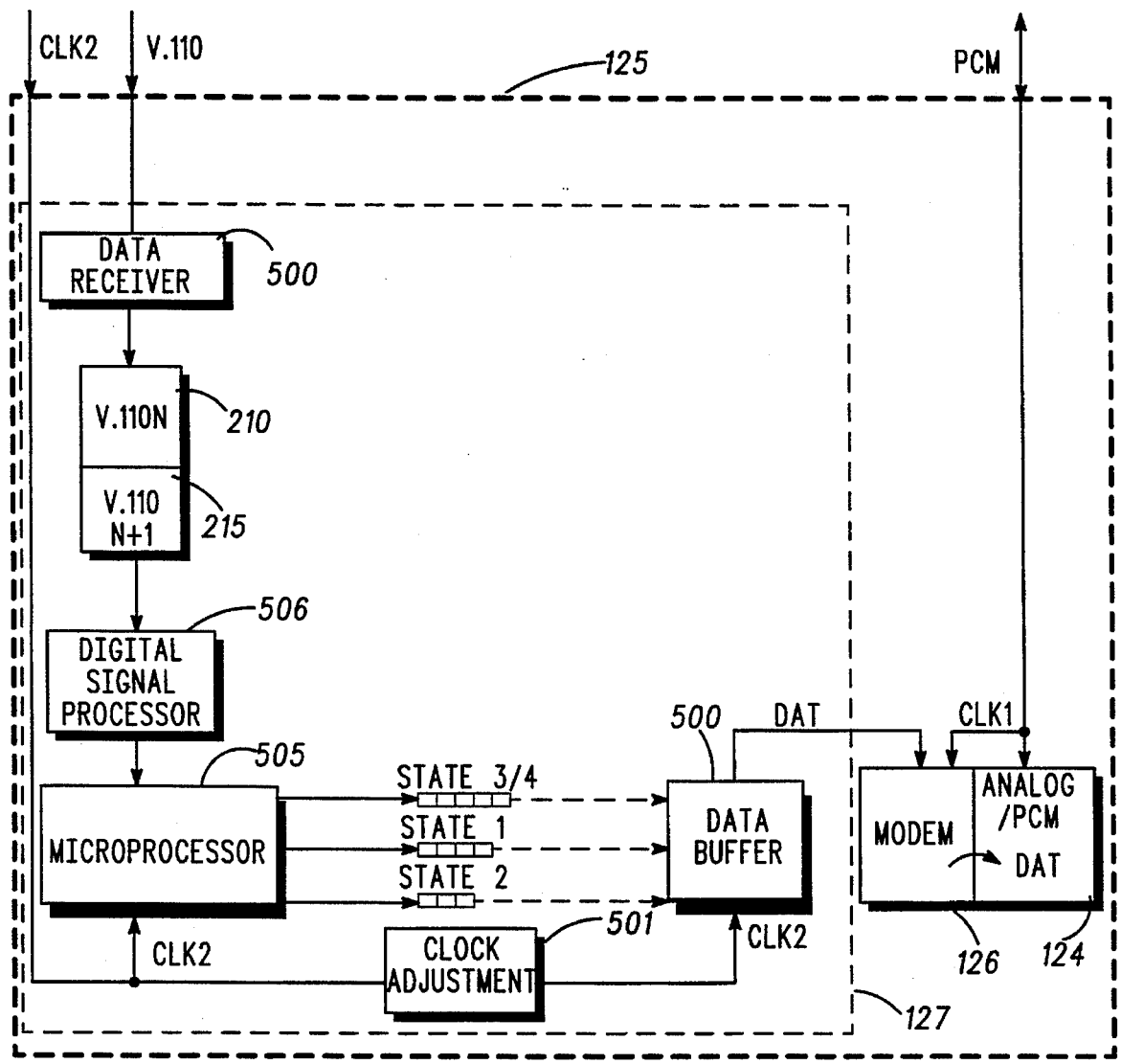

FIG. 5 generally illustrates an apparatus which performs independent clock rate matching in a receiver in accordance with the invention.

Figure 6:
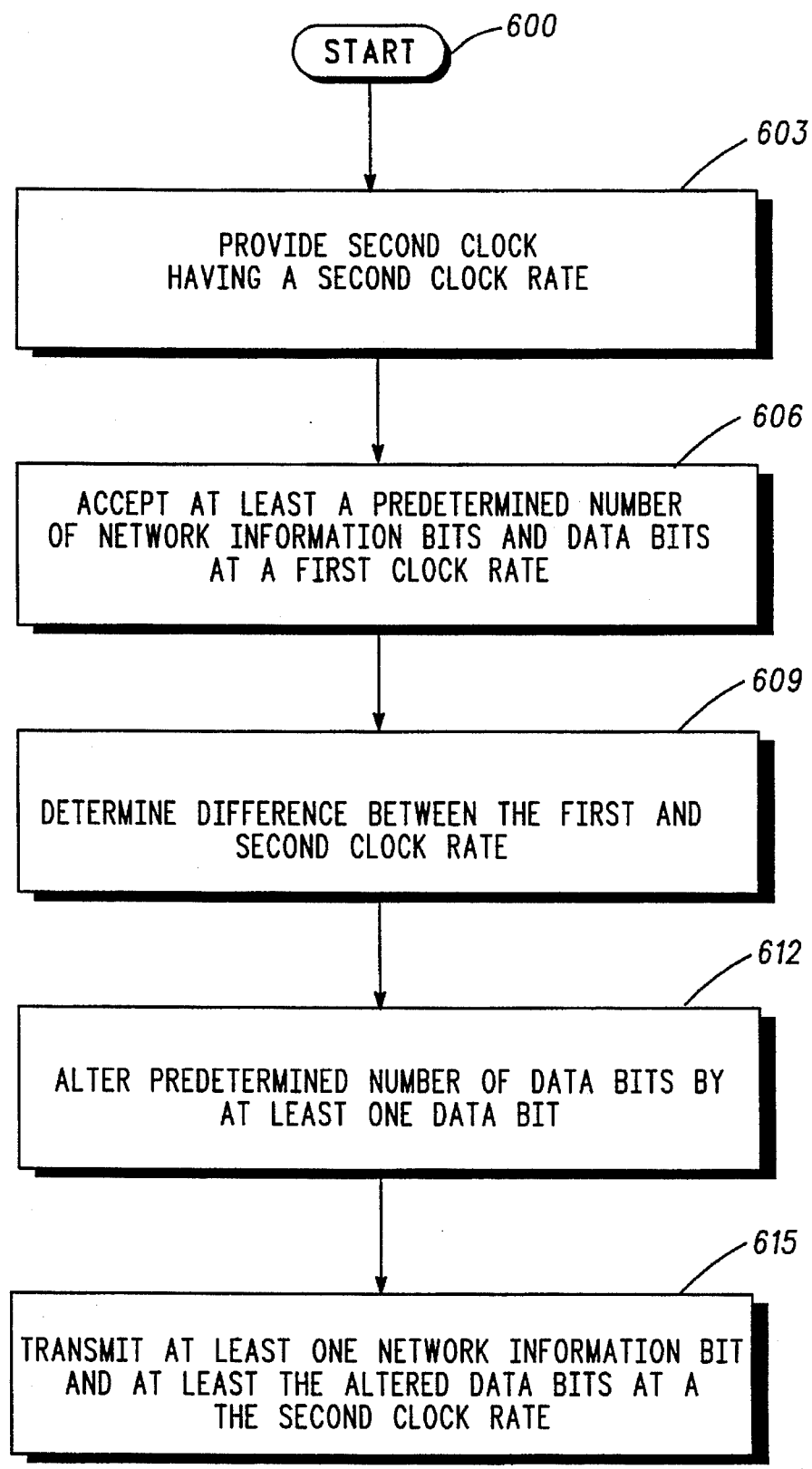

FIG. 6 generally illustrates in flow diagram form the steps the IWF undergoes to match independent clock rates and transmit data in accordance with the invention.

Figure 7:
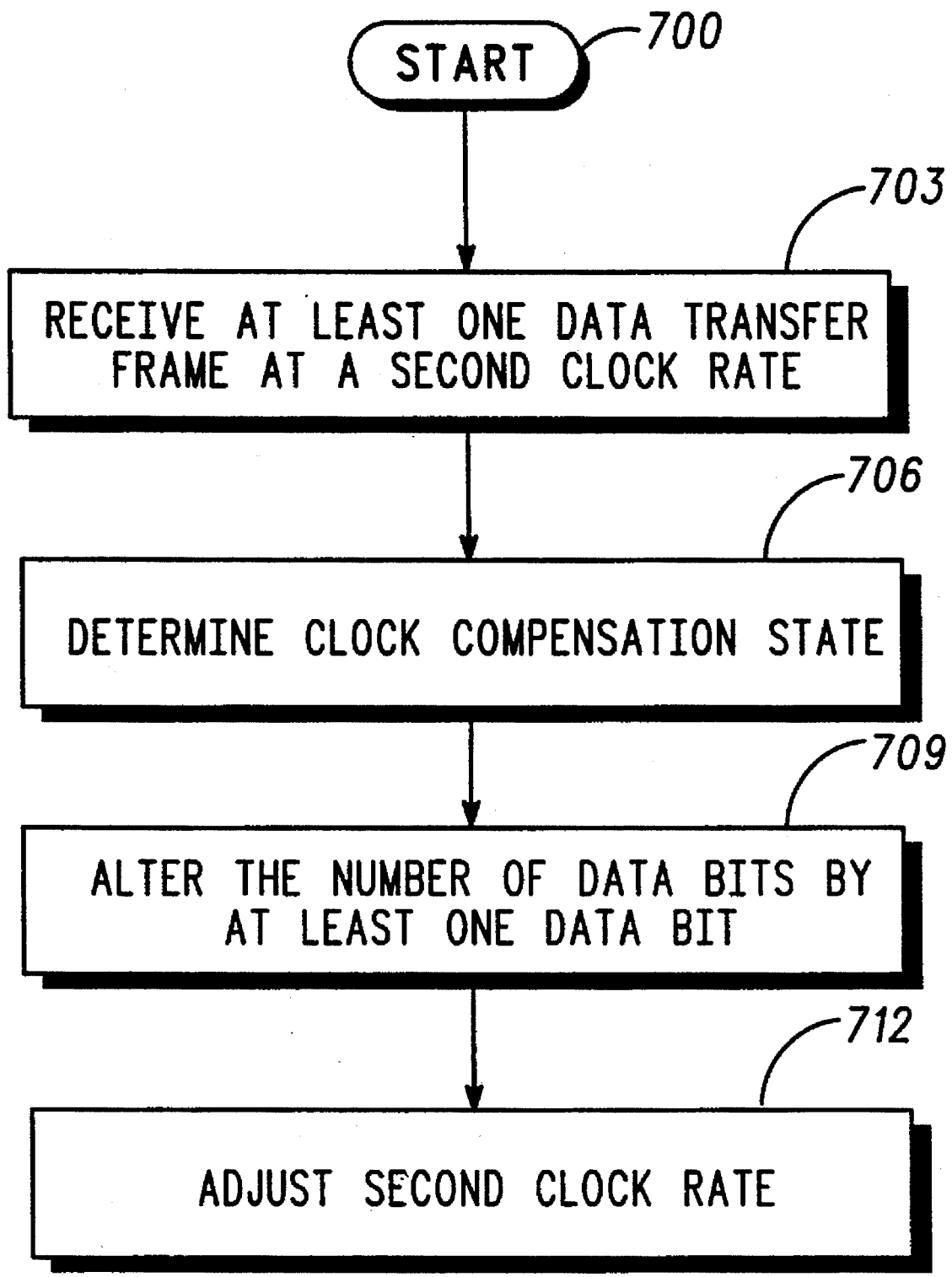

FIG. 7 generally illustrates in flow diagram form the steps the IWF undergoes to match independent clock rates and receive data in accordance with the invention.

Figure 8:
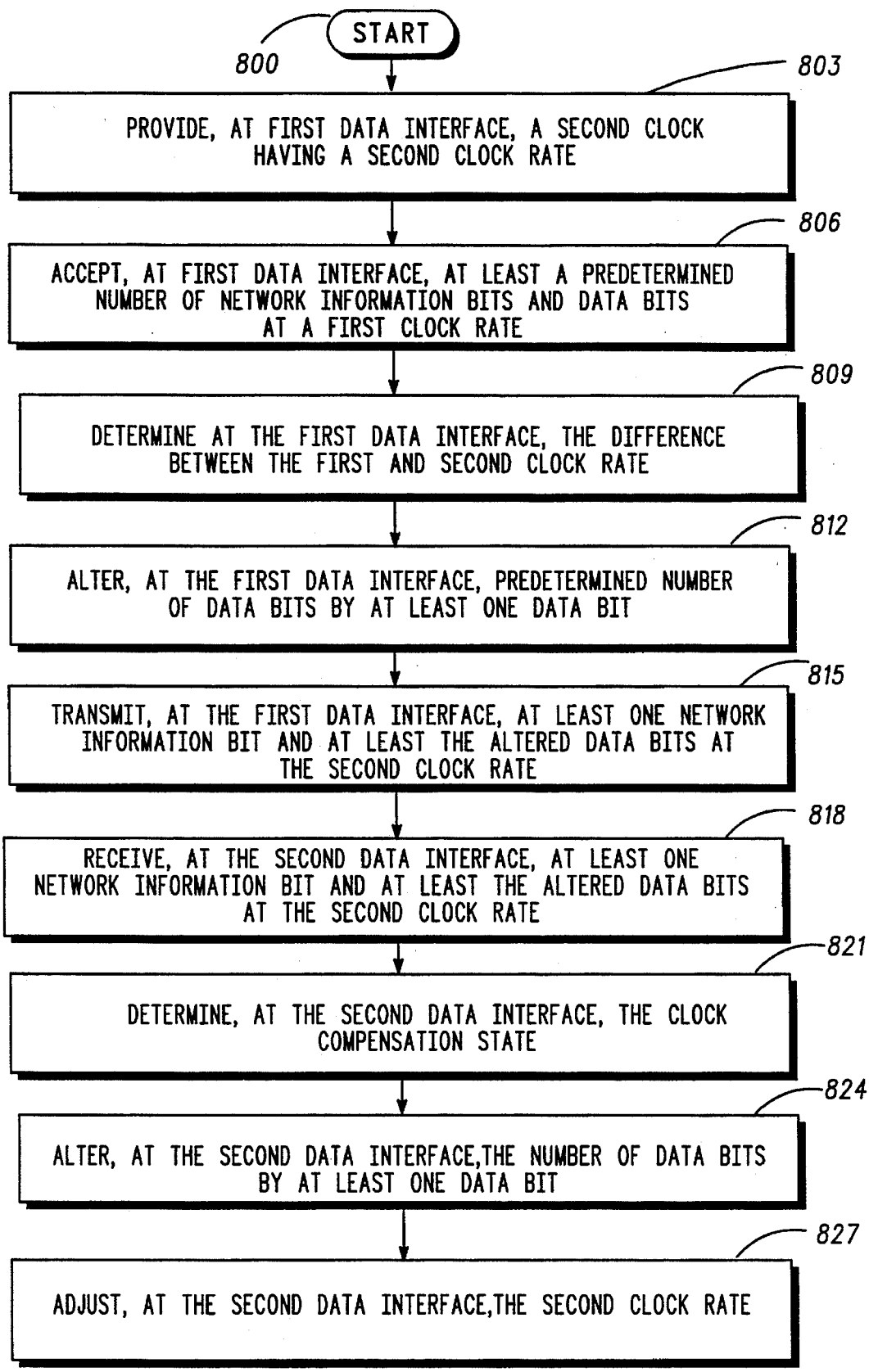

FIG. 8 generally illustrates in flow diagram form the steps a communication system undergoes to convey data from one network having independent clock sources to another network having independent clock sources in accordance with the invention.

DETAILED DESCRIPTION OF A PREFERRED EMBODIMENT

Figure 1:
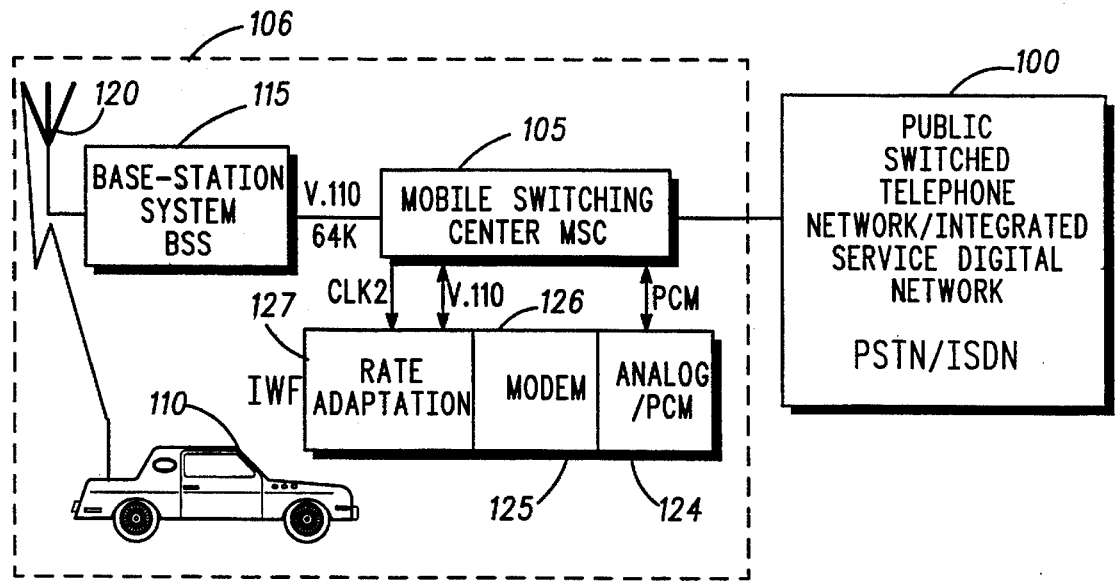

FIG. 1 generally depicts a communication or radiotelephone system which may incorporate the present invention. A public switched telephone network (PSTN)/integrated services digital network (ISDN) 100 is coupled to a mobile network (MN) 106. The PSTN/ISDN 100 is generally comprised of the land-line telephone system and computers or other data transfer hardware which might require modems to transmit data. A modem data call in the radiotelephone system of FIG. 1 is accomplished as follows. An originator in the PSTN 100 initiates a call to the mobile switching center (MSC) 105 in the MN 106. The call is sent to the MSC 105 in the form of audio where it is routed to a data interface or an interworking function (IWF) 125. The IWF 125 converts the audio format of the data coming from the PSTN 100 to a digital format (ISDN like) in the MN 106. The digital data is processed into a data transfer frame or V.110 frame format which is a standard rate adaptation frame used in the MN 106. The V.110 frame then enters a base-station system (BSS) 115 where it is further processed into a standard air interface format as specified in GSM Recommendation 4.21, version 3.2.0, March 1990. The data contained in the GSM air interface frame is transmitted over an antenna 120. A mobile 110 receives the air interface frame containing the data and processes (not shown) the data back to the V.110 format.

In the system shown in FIG. 1, the PSTN/ISDN 100 is not required to be synchronized to the MN 106. If it is synchronized, the corresponding clock signals that drive the modem 126 in the IWF 125 are synchronized to the rate adaptation block 127 in the IWF 125. Consequently, clock matching between the modem 126 and the rate adaptation block 127 is not required. If, however, the two networks are not synchronized, the clock driving the modem 126 will not be matched to the clock used in the rate adaptation block 127. For non-radiotelephone applications, the CCITT recommendation for the V.110 framing provides a mechanism to compensate for the problem of mis-matched clocks. The procedure, depending upon the data rate involved, adds or deletes full bits, ½ bits and ¼ bits of the V.110 frame as required to speed up or slow down the data rate.

FIG. 2 depicts the structure of a V.110 frame as defined in the CCITT recommendation V.100. The V.110 frame is comprised of 10 octets, each octet having 8 bits. Octet 0 is comprised of 8 "0" bits and is used for synchronization purposes. The first bit of every subsequent octet is a "1" bit and again is used for synchronization purposes. The remaining bits in the V.110 frame are comprised of three types of bits. D bits carry the user data stream, S and X bits carry the modem status signals, and E bits carry the user data rate and clock compensation information. In the preferred embodiment, the E bits, specifically E4, E5, E6, and E7 are modified in the inventive clock compensation procedure. FIG. 3 generally depicts a first V.110 frame 300 and a second V.110 frame 305 transmitted to form a multi-frame 310, which is the implementation in the preferred embodiment. The use of four E bits from each of the two V.110 frames forms an 8 bit code word that is forward error corrected (FEC) encoded. Thus, 2 of the 8 E bits are used to represent the clock compensation states while the remaining 6 E bits are used to forward error correct the multi-frame.

Since the air interface uses a smaller bandwidth than the V.110 frame, some of the bits in the V.110 frame must be discarded and/or compressed. If the compensation mechanism stated in the CCITT recommendation V.110 were to be used, the added or deleted ½ or ¼ bits would be lost in the removal and compression of bits at the base-station system (BSS) 115 of the MN 106. In addition to the mapping problem between the air interface and the V.110 frames, the high BER could cause false addition or deletion of data bits. This falsing changes the number of transmitted data bits consequently leading to severe data errors.

FIG. 4 generally depicts the hardware that performs clock error rate matching in accordance with the invention. A pulse code modulated (PCM) signal which is typically used for audio communications in digital trunks or links, is input into an analog/PCM block 124. The PCM line contains samples of the audio and the clock, CLK1, of the PSTN 100. The clock information, labeled CLK1, is extracted by the modem 126. The user data enters the modem from the analog/PCM block 124 where it is re-formatted to its raw data form. The CLK1 signal is used to clock the raw data, symbolized by the DAT line exiting the modem 126. At this point, the DAT line contains data which is being transmitted at a first clock rate or CLK1. The data exiting the modem 126 is input into a data buffer 400 which resides in the rate adaptation block 127. The data is clocked into the buffer 400 by a second clock rate, CLK2 which is derived from the MSC 105. The data buffer 400 accepts the data from the DAT line. At this point, the clock difference between CLK1 and CLK2 is determined. This determination is accomplished by setting pointers in the data buffer 400. For example, one pointer measures the rate at which data bits enter the data buffer 400, which would be at the rate of CLK1, and a second pointer measures the rate of data exiting the data buffer 400, which would be the rate of CLK2 clocking data out of the buffer 400. If CLK1 is less than CLK2 by a lower threshold, a clock underspeed condition occurs. In this condition, data on the DAT line entering the buffer is entering the data buffer 400 slower than data is exiting the data buffer 400. To match the two clock rates, the data exiting the data buffer 400 will have an entire bit deleted when the clock underspeed falls below a lower threshold. Likewise, if CLK1 is greater than CLK2 by an upper threshold, a clock overspeed condition occurs whereby data is entering the data buffer 400 faster than data is exiting the data buffer 400. In this condition, the rate of data exiting the data buffer 400 must increase, thus an entire bit is added to the data exiting the buffer 400. This insertion occurs when the clock overspeed or the difference in the two clock rates exceeds an upper threshold. If the difference between CLK1 and CLK2 is not above or below the upper or lower threshold, the data exiting the buffer 400 is not altered.

Four clock compensation states are possible in the preferred embodiment and are depicted in Table 1 for illustrative purposes only; the state versus bit pattern may change depending on the system design.

TABLE 1

|         | FUNCTION    | BIT PATTERN |
|---------|-------------|-------------|
| STATE 1 | NO CHANGE   | "00"        |
| STATE 2 | DELETE 1 BIT| "01"        |
| STATE 3 | INSERT "0"  | "10"        |
| STATE 4 | INSERT "1"  | "11"        |

Table 1 generally depicts the clock compensation states and their corresponding function and bit pattern, and again is only for illustrative purposes. In the case where the two clocks are essentially equivalent, no change is required in the data bits exiting the buffer 400, so state 1 representing no change might correspond to a bit pattern of "00". For a clock underspeed condition, where the requirement is to delete one bit, a second state, or state 2 might be represented by a bit pattern of "01". For clock overspeed, 2 separate states are necessary since the clock overspeed condition requires that a bit be inserted into the exiting data bits; the inserted bit may either be a "0" or "1". State 3 then corresponds to inserting a "0" bit and might be represented by a bit pattern of "10" while state 4 corresponds to inserting a bit "1" and might be represented by a bit pattern of "11". Hysteresis capability can be added by setting two thresholds for each pointer, depending on the state of the compensation.

The determination of the proper clock compensation state is accomplished by a digital signal processor (DSP) 406 and a microprocessor (µP) 405, which in the preferred embodiment are a Motorola 56001 DSP and a Motorola 68020 µP. The µP monitors the pointers in the buffer 400 and determines the appropriate state and representative bit pattern by comparing the rate at which data enters the buffer 400 to the rate at which data exits the buffer 400. As the µP 405 receives data from the modem 126, the µP 405 formats the data into a V.110 frame. Once the required compensation state has been determined, the DSP 406 alters the number of data bits in the multi-frame 310 accordingly. If the µP 405 determines that no change is necessary, a bit pattern of "00"

is used as a compensation state, and no alteration of the number of data bits D in the multi-frame occurs. If the µP 405 determines a clock underspeed is present, i.e. state 2, a bit pattern of "01" is inserted into two of the eight E bits in the multi-frame 310. In this case, the terminal receiving the multi-frame 310 will ignore the data bit immediately following the E bits of the second V.110 frame 305. If the µP 405 determines that the number of data bits in the multi-frame 310 needs to be increased by a bit, the µP 405 will increase the number by adding a "0" or "1" bit in the total user data bits. This occurs between the last data bit preceding the E bits and the first data bit following the E bits in the second V.110 frame.

The IWF 125 is a duplex system, thus it also receives V.110 frames that have been transmitted and altered. FIG. 5 depicts the receiving and transformation process from the V.110 frame to the raw data as required as input by the modem 126. A data receiver 500 receives the multi-frame 310 which again is comprised of a first V.110 frame 300 and a second V.110 frame 305. The frames are input into a DSP 506 and a µP 505, which again in the preferred embodiment are a Motorola 56001 DSP and a Motorola 68020 µP. The µP 505 and the DSP 506 are clocked by CLK2 which is derived from the MN 106 clock. Depending on the compensation state received, the DSP 506 decodes the forward error correction that was performed on the compensation state bits, and sends the decoded state to the µP 505 where the data bits of the multi-frame 310 are altered accordingly. For example, if the compensation state is state 2, the microprocessor will ignore the data bit immediately following the E bits of the second V.110 frame 305. If the decoded state is such that a state 3 or state 4 condition is present, the microprocessor will add a bit in to the raw data bits exiting the microprocessor 505. Output from the microprocessor 505 is input into a data buffer 500 which again has a clock input of CLK2. By invoking the correct compensation, the µP 505 creates the new rate for the modem 126 which has data clocked into it at CLK1. The data is conveyed to the analog/PCM block 124 where it is converted to a PCM signal and conveyed back to the MSC 105. At this point, referring to FIG. 1, the MSC 105 transmits the data to the PSTN/ISDN networks 100 in a audio modulation format using PCM samples.

FIG. 6 generally illustrates in flow diagram form the steps the IWF undergoes to match independent clock rates and transmit data in accordance with the invention. The process in the IWF starts at 600 by providing at 603 a clock having a second clock rate and accepting at 606 at least a predetermined number of network information bits and data bits at a first clock rate. The µP 405 then determines at 609 the difference between the first clock rate and the second clock rate. The DSP 406 alters at 612 the predetermined number of data bits by at least one bit and the data transmitter 420 transmits at 615 at least one network information bit and at least the altered data bits at the second clock rate.

FIG. 7 generally illustrates in flow diagram form the steps the IWF undergoes to match independent clock rates and receive data in accordance with the invention. The process in the IWF starts at 700 when a data receiver 500 receives at 703 at least one data transfer frame at a second clock rate. The DSP 506 determines at 706 the clock compensation state, the µP 505 alters at 709 the number of data bits by at least one data bit and the clock adjustment block 501 adjusts at 712 the second clock rate to match the clock rate of the destination network.

FIG. 8 generally illustrates in flow diagram form the steps a communication system undergoes to convey data from one network having independent clock sources to another network having independent clock sources in accordance with the invention. The process starts at 800 when the first data interface provides at 803 a second clock having a second clock rate. The first data interface then accepts at 806 at least a predetermined number of network information bits and data bits at a first clock rate and determines at 809 the difference between the first and second clock rate. The first data interface then alters at 812 the predetermined number of data bits by at least one data bit and transmits at 815 at least one network information bit and at least the altered data bits at the second clock rate. The second data interface then receives at 818 at least one network information bit and at least the altered data bits at the second clock rate and determines at 821 the clock compensation state. The second data interface then alters at 824 the number of data bits by at least one data bit and adjusts at 827 the second clock rate to match the clock rate of the destination network.

Not only is this procedure for clock matching of independent clock sources across networks used in the IWF 125, but it can also be used in mobiles 110 may also require clock rate matching to an independent source. In addition, the methods described can be used in a purely ISDN environment where separate, asynchronous ISDN clock sources are used.

Since the preferred embodiment of the inventive apparatus and method is a digital radiotelephone system, high BER rates are not unusual during transmission over the air interface. By using two bits to represent the clock compensation state and the remaining six bits as forward error correction, the susceptibility to the higher BER rates in the digital radiotelephone system is decreased. In the preferred embodiment two V.110 frames are used for a total of eight E bits. To decrease the susceptibility of the high BER rates even further, more than two successive V.110 frames may be employed resulting in more E bits used for forward error correction. In addition, other methods of forward error correction may be employed. For example, by using one V.110 frame having a total of four E bits, and using two E bits for clock compensation and the remaining E bits and extra S and X bits for forward error correction, the decreasing of susceptibility to high BER can still be accomplished. Likewise, anywhere from one of the E bits to four of the E bits used for clock compensation in a V.110 frame could be used as a clock compensation state and forward error correction could be accomplished by repeating the particular state over a predetermined number of V.110 frames. In this scenario, the initial V.110 frame would have a determined state and successive V.110 frames would contain the same state and, when the system is satisfied that the "correct" compensation state has been received, it will continue to receive different V.110 frames containing a different clock compensation state. Any number of forward error correction schemes may be employed.

By incorporating the inventive apparatus and method into a radiotelephone system, such as GSM, the problem of matching asynchronous/independent clock sources is solved. The method alters data bits in a V.110 frame by at least one full data bit thus ensuring that compression and optimization at the air interface does not lose the data bits that, if were fractional, would be lost. Reliability of the transmission is increased by forward error correcting the compensation states, thus reducing the method's susceptibility to errors due to high BER's. In addition, the use of simple data buffers, which are typically used in a data transfer environment, can be used to replace expensive and complicated phase difference detectors and the additional sampling techniques required for their use.

What we claim is:

1. An apparatus for matching clock rates between independent networks, the apparatus employed in a radiotelephone network and having as input bits arranged in ISDN frames and conveyed at a first clock rate, the apparatus comprising:

means for providing a second clock rate;

means for determining a clock compensation state code word based on the difference between said first clock rate and said second clock rate; and means, responsive to said means for determining, for directing a receiver within said radiotelephone network to adjust to said first clock rate based on said clock compensation state code word conveyed to the receiver over two ISDN frames.

2. A transmitter for matching clock rates between independent networks, the transmitter employed in a radiotelephone network and having as input at least network information bits and at least data bits conveyed at a first clock rate, the transmitter comprising:

means for providing a second clock having a second clock rate;

means for accepting at least a predetermined number of said network information bits and at least a predetermined number of said data bits conveyed at said first clock rate;

means for determining a rate difference between said first clock rate and said second clock rate;

means, responsive to said means for determining, for setting at least one network information bit to a predetermined value to represent a selected clock compensation state; and means for transmitting said at least one network information bit representing said selected clock compensation state to direct a receiver clocked at said second clock rate to adjust itself to said first clock rate.

3. The transmitter of claim 2 wherein said means for accepting further comprises means for buffering said at least a predetermined number of network information bits and said predetermined number of data bits.

4. The transmitter of claim 3 wherein said means for determining further comprises means for determining the difference between the rate at which said at least a predetermined number of network information bits and a predetermined number of data bits enter said buffering means and the rate at which said at least a predetermined number of network information bits and said predetermined number of data bits exit said buffering means.

5. The transmitter of claim 4 wherein said means for determining further comprises means for providing a lower rate difference threshold.

6. The transmitter of claim 4 wherein said means for determining further comprises means for providing an upper rate difference threshold.

7. The transmitter of claim 2 wherein said means for setting at least one network information bit to a predetermined value further comprises:

means for setting said at least one network information bit to a predetermined value representing a first clock compensation state when said determined rate difference is less than a lower rate difference threshold;

means for setting said at least one network information bit to a predetermined value representing a second clock compensation state when said determined rate is less than an upper rate difference threshold and greater than said lower rate difference threshold; and means for setting said at least one network information bit to a predetermined value representing a third clock compensation state when said determined rate is greater than said upper rate difference threshold.

8. The transmitter of claim 7 wherein said means for transmitting to direct a receiver clocked at said second clock rate to adjust itself to said first clock rate further comprises:

means for transmitting said first clock compensation state to direct said receiver to delete one data bit from said predetermined number of data bits; and means for transmitting said third clock compensation state to direct said receiver to increase said predetermined number of data bits by at least one data bit.

9. The transmitter of claim 2 wherein said means for setting further comprises means for forward error correcting said at least one network information bit.

10. A receiver which matches clock rates between independent networks, the receiver employed in a source network and coupled to a destination network having a first clock rate, the receiver having as at least one input a plurality of serially conveyed data transfer frames, the data transfer frames comprised of at least a predetermined number of network information bits and a predetermined number of data bits conveyed at a second clock rate, the predetermined number of network information bits having at least one bit representing at least one clock compensation state, the receiver comprising:

means for receiving at least one data transfer frame having at least said predetermined number of network information bits and said predetermined number of data bits conveyed at a second clock rate;

means, responsive to the receipt of said predetermined number of network information bits, for determining the clock compensation state;

means, responsive to said means for determining, for altering said received predetermined number of data bits by at least one data bit; and means, responsive to said means for altering, for adjusting said second clock rate to match said first clock rate.

11. The receiver of claim 10 wherein said means for determining the clock compensation state further comprises means for determining at least one of a first, second, and third clock compensation state.

12. The receiver of claim 11 wherein said means for altering said predetermined number of data bits by at least one data bit further comprises:

means, responsive to said means for determining's determination of said first clock compensation state, for deleting one data bit from said predetermined number of data bits; and means, responsive to said means for determining's determination of said third clock compensation state, for increasing said predetermined number of data bits by at least one data bit.

13. A data interface in a radiotelephone network employing a transmitter for matching clock rates between independent networks, the transmitter having as input at least network information bits and at least data bits conveyed at a first clock rate, the data interface comprising:

means for providing a second clock having a second clock rate;

means for accepting at least a predetermined number of said network information bits and at least a predetermined number of said data bits conveyed at said first clock rate;

means for determining a rate difference between said first clock rate and said second clock rate;

means, responsive to said means for determining, for setting at least one network information bit to a predetermined value to represent a selected clock compensation state; and means for transmitting said at least one network information bit representing said selected clock compensation state to direct a receiver clocked at said second clock rate to adjust itself to said first clock rate.

14. The data interface of claim 13 wherein said means for accepting further comprises means for buffering said at least a predetermined number of network information bits and said predetermined number of data bits.

15. The data interface of claim 14 wherein said means for determining further comprises means for determining the difference between the rate at which said at least a predetermined number of network information bits and a predetermined number of data bits enter said buffering means and the rate at which said at least a predetermined number of network information bits and said predetermined number of data bits exit said buffering means.

16. The data interface of claim 15 wherein said means for determining further comprises means for providing a lower rate difference threshold.

17. The data interface of claim 15 wherein said means for determining further comprises means for providing an upper rate difference threshold.

18. The data interface of claim 13 wherein said means for setting at least one network information bit to a predetermined value further comprises:

means for setting said at least one network information bit to a predetermined value representing a first clock compensation state when said determined rate difference is less than a lower rate difference threshold;

means for setting said at least one network information bit to a predetermined value representing a second clock compensation state when said determined rate is less than an upper rate difference threshold and greater than said lower rate difference threshold; and means for setting said at least one network information bit to a predetermined value representing a third clock compensation state when said determined rate is greater than said upper rate difference threshold.

19. The data interface of claim 18 wherein said means for transmitting to direct a receiver clocked at said second clock rate to adjust itself to said first clock rate further comprises:

means for transmitting said first clock compensation state to direct said receiver to delete one data bit from said predetermined number of data bits; and means for transmitting said third clock compensation state to direct said receiver to increase said predetermined number of data bits by at least one data bit.

20. The data interface of claim 13 wherein said means for setting further comprises means for forward error correcting said at least one network information bit.

21. A data interface in a source network employing a receiver which matches clock rates between independent networks, the receiver having as at least one input a plurality of serially conveyed data transfer frames, the data transfer frames comprised of at least a predetermined number of network information bits and a predetermined number of data bits conveyed at a second clock rate, the predetermined number of network information bits having at least one bit representing at least one clock compensation state, the data interface comprising:

means for receiving at least one data transfer frame having at least a predetermined number of network information bits and a predetermined number of data bits conveyed at a second clock rate;

means, responsive to the receipt of said predetermined number of network information bits, for determining the clock compensation state;

means, responsive to said means for determining, for altering said predetermined number of data bits by at least one data bit; and means, responsive to said means for altering, for adjusting said second clock rate to match said first clock rate.

22. The data interface of claim 21 wherein said means for determining the clock compensation state further comprises means for determining at least one of a first, second, and third clock compensation state.

23. The data interface of claim 22 wherein said means for altering said predetermined number of data bits by at least one data bit further comprises:

means, responsive to said means for determining's determination of a first clock compensation state, for deleting one data bit from said predetermined number of data bits; and means, responsive to said means for determining's determination of a third clock compensation state, for increasing said predetermined number of data bits by at least one data bit.

24. A communication system employing at least a first and second data interface for matching clock rates between independent networks, the first data interface employing a transmitter having as input at least network information bits and at least data bits conveyed at a first clock rate, the second data interface coupled to a destination network having a third clock rate, the communication system comprising:

means, at the first data interface, for providing a second clock having a second clock rate;

means, at the first data interface, for accepting at least a predetermined number of network information bits and at least a predetermined number of data bits conveyed at a first clock rate;

means, at the first data interface, for determining the difference between said first clock rate and said second clock rate;

means, at the first data interface and responsive to said means for determining, for setting at least one network information bit to a predetermined value to represent a selected clock compensation state;

means, at the first data interface, for transmitting said at least one network information bit representing a selected clock compensation state to the second data interface;

means, at the second data interface, for receiving said at least one network information bit representing a selected clock compensation state;

means, at the second data interface and responsive to the receipt of said at least one network information bit, for determining said selected clock compensation state; and means, at the second data interface and responsive to said means for determining, for altering said received data bits by an integer multiple of data bits to adjust said second clock rate to match said third clock rate.

25. A transmitter for matching clock rates between independent networks, the transmitter employed in a source network and having as input at least status bits, network information bits and data bits conveyed at a first clock rate, the transmitter comprising:

means for providing a second clock having a second clock rate;

means for accepting at least a predetermined number of status bits, at least a predetermined number of network information bits and at least a predetermined number of data bits conveyed at a first clock rate;

means for determining a rate difference between said first clock rate and said second clock rate;

means, responsive to said means for determining, for setting at least one network information bit to a predetermined value to represent a selected clock compensation state;

means for adapting at least said predetermined number of status bits, at least said predetermined number of network information bits and at least said predetermined number of data bits into at least two groups representing data transfer frames;

means, employing at least one of the remaining network information bits from a first data transfer frame, for forward error correcting said at least one network information bit of said first data transfer frame;

means, responsive to said means for setting, for altering said predetermined number of data bits of said second data transfer frame by at least one data bit; and means for transmitting at least said first and second data transfer frames.

26. The transmitter of claim 25 wherein said means for accepting further comprises means for buffering said at least a predetermined number of status bits, at least a predetermined number of network information bits and a predetermined number of data bits.

27. The transmitter of claim 26 wherein said means for determining further comprises means for determining the difference between the rate at which said at least a predetermined number of status bits, at least a predetermined number of network information bits, and at least a predetermined number of data bits enter said buffering means and the rate at which said at least a predetermined number of status bits, at least a predetermined number of network information bits, and at least a predetermined number of data bits exit said buffering means.

28. The transmitter of claim 27 wherein said means for determining further comprises means for providing a lower rate difference threshold.

29. The transmitter of claim 27 wherein said means for determining further comprises means for providing an upper rate difference threshold.

30. The transmitter of claim 25 wherein said means for setting at least one network information bit to a predetermined value further comprises:

means for setting said at least one network information bit to a predetermined value representing a first clock compensation state when said determined rate difference is less than a lower rate difference threshold;

means for setting said at least one network information bit to a predetermined value representing a second clock compensation state when said determined rate is less than an upper rate difference threshold and greater than said lower rate difference threshold; and means for setting said at least one network information bit to a predetermined value representing a third clock compensation state when said determined rate is greater than said upper rate difference threshold.

31. The transmitter of claim 30 wherein said means for altering said predetermined number of data bits by at least one data bit further comprises:

means, responsive to said first clock compensation state, for deleting one data bit from said predetermined number of data bits; and means, responsive to said third clock compensation state, for increasing said predetermined number of data bits by at least one data bit.

32. The transmitter of claim 25 further comprising means, employing at least one status bit from at least one of said first and second data transfer frames, for forward error correcting said predetermined number of status bits.

33. The transmitter of claim 25 wherein said means for setting further comprises means for forward error correcting said at least one network information bit.

34. A receiver for matching clock rates between independent networks, the receiver employed in a source network and coupled to a destination network having a first clock rate, the receiver having as at least one input a plurality of serially conveyed data transfer frames, the data transfer frames comprised of at least a predetermined number of status bits, a predetermined number of network information bits and a predetermined number of data bits conveyed at a second clock rate, the predetermined number of network information bits having at least one bit representing at least one clock compensation state and at least one bit representing forward error correction of said at least one bit representing at least one clock compensation state, the receiver comprising:

means for receiving at least first and second data transfer frames, each comprised of at least a predetermined number of status bits, at least a predetermined number of network information bits, and a predetermined number of data bits conveyed at a second clock rate;

means, responsive to the receipt of said predetermined number of network information bits, for decoding said forward error correction of said received at least one network information bit representing at least one clock compensation state to determine a clock compensation state;

means, responsive to said means for decoding, for altering said predetermined number of data bits of said second data transfer frame by at least one data bit; and means, responsive to said means for altering, for adjusting said second clock rate to match said first clock rate.

35. The receiver of claim 34 wherein said means for determining the clock compensation state further comprises means for determining at least one of a first, second, and third clock compensation state.

36. The receiver of claim 35 wherein said means for altering said predetermined number of data bits by at least one data bit further comprises:

means, responsive to said means for determining's determination of a first clock compensation state, for deleting one data bit from said predetermined number of data bits; and means, responsive to said means for determining's determination of a third clock compensation state, for increasing said predetermined number of data bits by at least one data bit.

37. A data interface in a source network employing a transmitter for matching clock rates between independent networks, the transmitter employed in a source network and having as input at least status bits, network information bits and data bits conveyed at a first clock rate, the data interface comprising:

means for providing a second clock having a second clock rate;

means for accepting at least a predetermined number of status bits, at least a predetermined number of network information bits and at least a predetermined number of data bits conveyed at a first clock rate;

means for determining a rate difference between said first clock rate and said second clock rate;

means, responsive to said means for determining, for setting at least one network information bit to a predetermined value to represent a selected clock compensation state;

means for adapting at least said predetermined number of status bits, at least said predetermined number of network information bits and at least said predetermined number of data bits into at least two groups representing data transfer frames;

means, employing at least one of the remaining network information bits from a first data transfer frame, for forward error correcting said at least one network information bit of a first data transfer frame;

means, responsive to said means for setting, for altering said predetermined number of data bits of a second data transfer frame by at least one data bit; and means for transmitting at least said first and second data transfer frames.

38. The data interface of claim 37 wherein said means for accepting further comprises means for buffering said at least a predetermined number of status bits, at least a predetermined number of network information bits and a predetermined number of data bits.

39. The data interface of claim 38 wherein said means for determining further comprises means for determining the difference between the rate at which said at least a predetermined number of status bits, at least a predetermined number of network information bits, and at least a predetermined number of data bits enter said buffering means and the rate at which said at least a predetermined number of status bits, at least a predetermined number of network information bits, and at least a predetermined number of data bits exit said buffering means.

40. The data interface of claim 39 wherein said means for determining further comprises means for providing a lower rate difference threshold.

41. The data interface of claim 39 wherein said means for determining further comprises means for providing an upper rate difference threshold.

42. The data interface of claim 37 wherein said means for setting at least one network information bit to a predetermined value further comprises:

means for setting said at least one network information bit to a predetermined value representing a first clock compensation state when said determined rate difference is less than a lower rate difference threshold;

means for setting said at least one network information bit to a predetermined value representing a second clock compensation state when said determined rate is less than an upper rate difference threshold and greater than said lower rate difference threshold; and means for setting said at least one network information bit to a predetermined value representing a third clock compensation state when said determined rate is greater than said upper rate difference threshold.

43. The data interface of claim 42 wherein said means for altering said predetermined number of data bits by at least one data bit further comprises:

means, responsive to said first clock compensation state, for deleting one data bit from said predetermined number of data bits; and means, responsive to said third clock compensation state, for increasing said predetermined number of data bits by at least one data bit.

44. The data interface of claim 37 further comprising means, employing at least one status bit from at least one of said first and second data transfer frames, for forward error correcting said predetermined number of status bits.

45. The data interface of claim 37 wherein said means for setting further comprises means for forward error correcting said at least one network information bit.

46. A data interface in a source network employing a receiver for matching clock rates between independent networks, the receiver employed in a source network and coupled to a destination network having a first clock rate, the receiver having as at least one input a plurality of serially conveyed data transfer frames, the data transfer frames comprised of at least a predetermined number of status bits, a predetermined number of network information bits and a predetermined number of data bits conveyed at a second clock rate, the predetermined number of network information bits having at least one bit representing at least one clock compensation state and at least one bit representing forward error correction of said at least one bit representing at least one clock compensation state, the data interface comprising:

means for receiving at least first and second data transfer frames, each comprised of at least a predetermined number of status bits, at least a predetermined number of network information bits, and a predetermined number of data bits conveyed at a second clock rate;

means, responsive to the receipt of said predetermined number of network information bits, for decoding said forward error correction of said received at least one network information bit representing at least one clock compensation state to determine a clock compensation state;

means, responsive to said means for decoding, for altering said predetermined number of data bits of said second data transfer frame by at least one data bit; and means, responsive to said means for altering, for adjusting said second clock rate to match said first clock rate.

47. The data interface of claim 46 wherein said means for determining the clock compensation state further comprises means for determining at least one of a first, second, and third clock compensation state.

48. The data interface of claim 47 wherein said means for altering said predetermined number of data bits by at least one data bit further comprises:

means, responsive to said means for determining's determination of a first clock compensation state, for deleting one data bit from said predetermined number of data bits; and means, responsive to said means for determining's determination of a third clock compensation state, for increasing said predetermined number of data bits by at least one data bit.

49. A communication system employing at least a first and second data interface for matching clock rates between independent networks, the first data interface employing a transmitter having as input at least status bits, at least network information bits, and at least data bits conveyed at a first clock rate, the second data interface coupled to a destination network having a third clock rate, the communication system comprising:

means, at the first data interface, for providing a second clock having a second clock rate;

means, at the first data interface, for accepting at least a predetermined number of status bits, at least a predetermined number of network information bits and at least a predetermined number of data bits conveyed at a first clock rate;

means, at the first data interface, for determining a rate difference between said first dock rate and said second clock rate;

means, at the first data interface and responsive to said means for determining, for setting at least one network information bit to a predetermined value to represent a selected clock compensation state;

means, at the first data interface, for adapting at least said predetermined number of status bits, at least said predetermined number of network information bits and at least said predetermined number of data bits into at least two groups representing data transfer frames;

means, at the first data interface and employing at least one of the remaining network information bits from a first data transfer frame, for forward error correcting said at least one network information bit of said first data transfer frame;

means, at the first data interface and responsive to said means for setting, for altering said predetermined number of data bits of said second data transfer frame by at least one data bit;

means, at the first data interface, for transmitting at least said first and second data transfer frames;

means, at the second data interface, for receiving at least said first and second data transfer frames, each comprised of at least a predetermined number of status bits, at least a predetermined number of network information bits, and a predetermined number of data bits conveyed at a second clock rate;

means, at the second data interface and responsive to the receipt of said predetermined number of network information bits, for decoding said forward error correction of said received at least one network information bit representing at least one clock compensation state to determine a clock compensation state;

means, at the second data interface and responsive to said means for decoding, for altering said predetermined number of data bits of said second data transfer frame by at least one data bit; and means, at the second data interface and responsive to said means for altering, for adjusting said second clock rate to match said third clock rate.

50. A method of matching clock rates between independent networks in a data interface, the data interface employing a transmitter having as input at least network information bits and at least data bits conveyed at a first clock rate, the method comprising the steps of:

providing a second clock having a second clock rate;

accepting at least a predetermined number of network information bits and at least a predetermined number of data bits conveyed at a first clock rate;

determining a rate difference between said first clock rate and said second clock rate;

setting, responsive to said step of determining, at least one network information bit to a predetermined value to represent a selected clock compensation state; and transmitting said at least one network information bit representing said selected clock compensation state to direct a receiver clocked at said second clock rate to adjust itself to said first clock rate.

51. The method of claim 50 wherein said step of accepting further comprises the step of buffering said at least a predetermined number of network information bits and said predetermined number of data bits.

52. The method of claim 51 wherein said step of determining further comprises the step of determining the difference between the rate at which said at least a predetermined number of network information bits and a predetermined number of data bits enter said buffering step and the rate at which said at least a predetermined number of network information bits and said predetermined number of data bits exit said buffering step.

53. The method of claim 52 wherein said step of determining further comprises the step of providing a lower rate difference threshold.

54. The method of claim 52 wherein said step of determining further comprises the step of providing an upper rate difference threshold.

55. The method of claim 50 wherein said step of setting at least one network information bit to a predetermined value further comprises the steps of:

setting said at least one network information bit to a predetermined value representing a first clock compensation state when said determined rate difference is less than a lower rate difference threshold;

setting said at least one network information bit to a predetermined value representing a second clock compensation state when said determined rate is less than an upper rate difference threshold and greater than said lower rate difference threshold; and setting said at least one network information bit to a predetermined value representing a third clock compensation state when said determined rate is greater than said upper rate difference threshold.

56. The method of claim 55 wherein said step of transmitting to direct a receiver clocked at said second clock rate to adjust itself to said first clock rate further comprises the steps of:

transmitting said first clock compensation state to direct said receiver to delete one data bit from said predetermined number of data bits; and transmitting said third clock compensation state to direct said receiver to increase said predetermined number of data bits by at least one data bit.

57. The method of claim 50 wherein said step of setting further comprises the step of forward error correcting said at least one network information bit.

58. A method of matching clock rates between independent networks in a data interface, the data interface employing a receiver having as at least one input a plurality of serially conveyed data transfer frames, the data transfer frames comprised of at least a predetermined number of network information bits and a predetermined number of data bits conveyed at a second clock rate, the predetermined number of network information bits having at least one bit representing at least one clock compensation state, the method comprising comprising the steps of:

receiving at least one data transfer frame having at least a predetermined number of network information bits and a predetermined number of data bits conveyed at a second clock rate;

determining, responsive to the receipt of said predetermined number of network information bits, the clock compensation state;

altering, responsive to said step of determining, said predetermined number of data bits by at least one data bit; and adjusting, responsive to said step of altering, said second clock rate to match said first clock rate.

59. The method of claim 58 wherein said step of determining the clock compensation state further comprises the step of determining at least one of a first, second, and third clock compensation state.

60. The method of claim 59 wherein said step of altering said predetermined number of data bits by at least one data bit further comprises the steps of:

deleting, responsive to said step of determining's determination of a first clock compensation state, one data bit from said predetermined number of data bits; and increasing, responsive to said step of determining's determination of a third clock compensation state, said predetermined number of data bits by at least one data bit.

61. A method of matching clock rates between independent networks in a communication system, the communication system employing at least a first and second data interface, the first data interface employing a transmitter having as input at least network information bits and at least data bits conveyed at a first clock rate, the second data interface coupled to a destination network having a third clock rate, the method comprising the steps of:

providing, at the first data interface, a second clock having a second clock rate;

accepting, at the first data interface, at least a predetermined number of network information bits and at least a predetermined number of data bits conveyed at a first clock rate;

determining, at the first data interface, the difference between said first clock rate and said second clock rate;

setting, at the first data interface and responsive to said step of determining, at least one network information bit to a predetermined value to represent a selected clock compensation state;

transmitting, at the first data interface, said at least one network information bit representing a selected clock compensation state to the second interface;

receiving, at the second data interface, said at least one network information bit representing a selected clock compensation state;

determining, at the second data interface and responsive to the receipt of said at least one network information bit, said selected clock compensation state; and altering, at the second data interface and responsive to said step of determining, said received data bits by an integer multiple of data bits to adjust said second clock rate to match said third clock rate.

62. In a radiotelephone communication system interfacing with a network having data clocked at different rates with respect to the data rate of the radiotelephone communication system, the network conveying information to the radiotelephone communication system via ISDN frames, the radiotelephone communication system having a transmitter and a receiver which convey data rate compensation information, a method of compensating for the data rate difference comprising the steps of:

placing the data rate compensation information into two ISDN frames;

transmitting, from the transmitter, the data rate compensation information to the receiver over the two ISDN frames;

receiving, at the receiver, the data rate compensation information from the two ISDN frames; and compensating, at the receiver, for the data rate difference by an integer multiple of bits.

63. The radiotelephone communication system of claim 62 where the receiver resides in either fixed-site cellular radiotelephone infrastructure equipment or a cellular radiotelephone mobile.

64. The radiotelephone communication system of claim 63 where said fixed-site cellular radiotelephone infrastructure equipment is further characterized by one of either a base-station system (BSS), a mobile switching center (MSC) or an interworking function (IWF).

65. In a radiotelephone communication system interfacing with a network having data clocked at different rates with respect to the data rate of the radiotelephone communication system, the network conveying information to the radiotelephone communication system via ISDN frames, the radiotelephone communication system having a transmitter and a receiver which convey data rate compensation information, a method for compensating for a data rate difference comprising the steps of:

determining the required compensation based on the data rate difference;

generating data rate compensation information based on the required compensation; and directing the receiver to compensate for the data rate difference by an integer multiple of bits based on said data rate compensation information conveyed to the receiver over two ISDN frames.

66. The radiotelephone communication system of claim 65 where the transmitter resides in either fixed-site cellular radiotelephone infrastructure equipment or a cellular radiotelephone mobile.

67. The radiotelephone communication system of claim 66 where the fixed-site cellular radiotelephone infrastructure equipment is further characterized by one of either a base-station system (BSS), a mobile switching center (MSC) or an interworking function (IWF).

68. In a radiotelephone communication system interfacing with a network having data clocked at different rates with respect to the data rate of the radiotelephone communication system, the network conveying information to the radiotelephone communication system via ISDN frames, the radiotelephone communication system having a transmitter and a receiver which convey data rate compensation information, a method for compensating for a data rate difference comprising the steps of:

determining the required compensation based on the data rate difference;

generating data rate compensation information based on the required compensation;

transmitting said data rate compensation information over two ISDN frames to a receiver;

receiving the data rate compensation information transmitted to said receiver; and compensating, in response to said step of receiving, for the data rate difference by an integer multiple of bits.

69. The radiotelephone communication system of claim 68 where either the transmitter or receiver reside in either fixed-site cellular radiotelephone infrastructure equipment or a cellular radiotelephone mobile.

70. The radiotelephone communication system of claim 69 where said fixed-site cellular radiotelephone infrastructure equipment is further characterized by one of either a base-station system (BSS), a mobile switching center (MSC) or an interworking function (IWF).

71. In a communication system interfacing with a network having data clocked at different rates, the communication system having a transmitter and a receiver which convey data rate compensation information in frames, a method for compensating for a data rate difference comprising the steps of:

determining the required compensation based on the data rate difference;

generating data rate compensation information based on the required compensation;

directing the receiver to compensate for the data rate difference by an integer multiple of bits and apportioning the data rate compensation information for conveyance over at least two frames;

receiving the data rate compensation information apportioned over at least two frames;

determining the required compensation based on the data rate compensation information; and compensating, in response to said step of directing, for the data rate difference by an integer multiple of bits.

72. The communication system of claim 71 where generating the data rate compensation information is further characterized by generating the data rate compensation information based on expected bit error rates of the communication system.

73. The communication system of claim 71 where either the transmitter or receiver reside in either fixed-site cellular radiotelephone infrastructure equipment or a cellular radiotelephone mobile.

74. The communication system of claim 71 where said fixed-site cellular radiotelephone infrastructure equipment is further characterized by one of either a base-station system (BSS), a mobile switching center (MSC) or an interworking function (IWF).

75. In a communication system interfacing with a network having data clocked at different rates, the communication system having a transmitter and a receiver which convey data rate compensation information in frames, a method for compensating for a data rate difference comprising the steps of:

determining the required compensation based on the data rate difference;

generating data rate compensation information based on the required compensation;

apportioning the data rate compensation information for conveyance over at least two frames;

receiving the data rate compensation information apportioned over at least two frames;

determining the required compensation based on the data rate compensation information; and compensating, in response to said step of generating, for the data rate difference.

76. The communication system of claim 75 where either the transmitter or receiver reside in either fixed-site cellular radiotelephone infrastructure equipment or a cellular radiotelephone mobile.

77. The communication system of claim 76 where said fixed-site cellular radiotelephone infrastructure equipment is further characterized by one of either a base-station system (BSS), a mobile switching center (MSC) or an interworking function (IWF).

78. In a communication system, especially a digital radiotelephone system, interfacing with a network having data clocked at different rates, the communication system conveying data rate compensation information in the form of a 5-bit code word in ISDN frames, a method for compensating for a data rate difference comprising the steps of:

determining the required compensation based on the data rate difference;

generating a 5-bit code word based on the required compensation;

apportioning the 5-bit code word over at least two ISDN frames for conveyance, wherein the 5-bit code word directs the receiver to compensate for the data rate difference by an integer multiple of bits;

compressing the at least two ISDN frames into a standard air interface format;

transmitting the standard air interface format via a radio frequency (RF) channel to a receiver which receives the standard air interface format;

de-compressing the standard air interface format into the at least two ISDN frames;

determining the 5-bit code word apportioned over the at least two ISDN frames;

determining the required compensation based on the 5-bit code word; and, compensating, in response thereto, for the data rate difference by an integer multiple of bits.

79. The communication system of claim 78 where compensating for the data rate difference by an integer multiple of bits is further characterized by protecting against elimination of the data rate compensation information during compression and de-compression by the communication system.

80. The communication system of claim 78 where the digital radiotelephone system is further characterized by at least one of a base-station system (BSS), a mobile switching center (MSC), an interworking function (IWF) or a mobile.

* * * * *